United States Patent [19]

Brown

[11] Patent Number: 4,575,585
[45] Date of Patent: Mar. 11, 1986

[54] SYNCHRONOUS PROGRAMMABLE SIGNAL GENERATOR AND METHOD

[75] Inventor: Leland T. Brown, Phoenix, Ariz.

[73] Assignee: Motorola Inc., Schaumburg, Ill.

[21] Appl. No.: 631,379

[22] Filed: Jul. 16, 1984

[51] Int. Cl.[4] .............................................. H04M 3/02
[52] U.S. Cl. .................................. 179/84 A; 307/261; 328/25; 179/51 AA; 363/160
[58] Field of Search ............. 179/84 R, 84 A, 84 VF, 179/18 HB, 51 AA, 17 E; 363/125, 126, 159, 160; 307/261, 271; 328/25

[56] References Cited

U.S. PATENT DOCUMENTS 4,220,826  9/1980  Kiss ............................. 179/51 AA
4,349,703  9/1982  Chea, Jr. ..................... 179/51 AA Primary Examiner—James L. Dwyer
Attorney, Agent, or Firm—W. J. Kubida; D. E. Jepsen

[57] ABSTRACT

A programmable signal generator and method for generating frequencies that are subharmonics of a rectified 60 hertz input signal. Opto-coupled triacs systematically switch and rectify the input signal frequency to provide, for example, a ringing signal for a telephone system.

18 Claims, 5 Drawing Figures

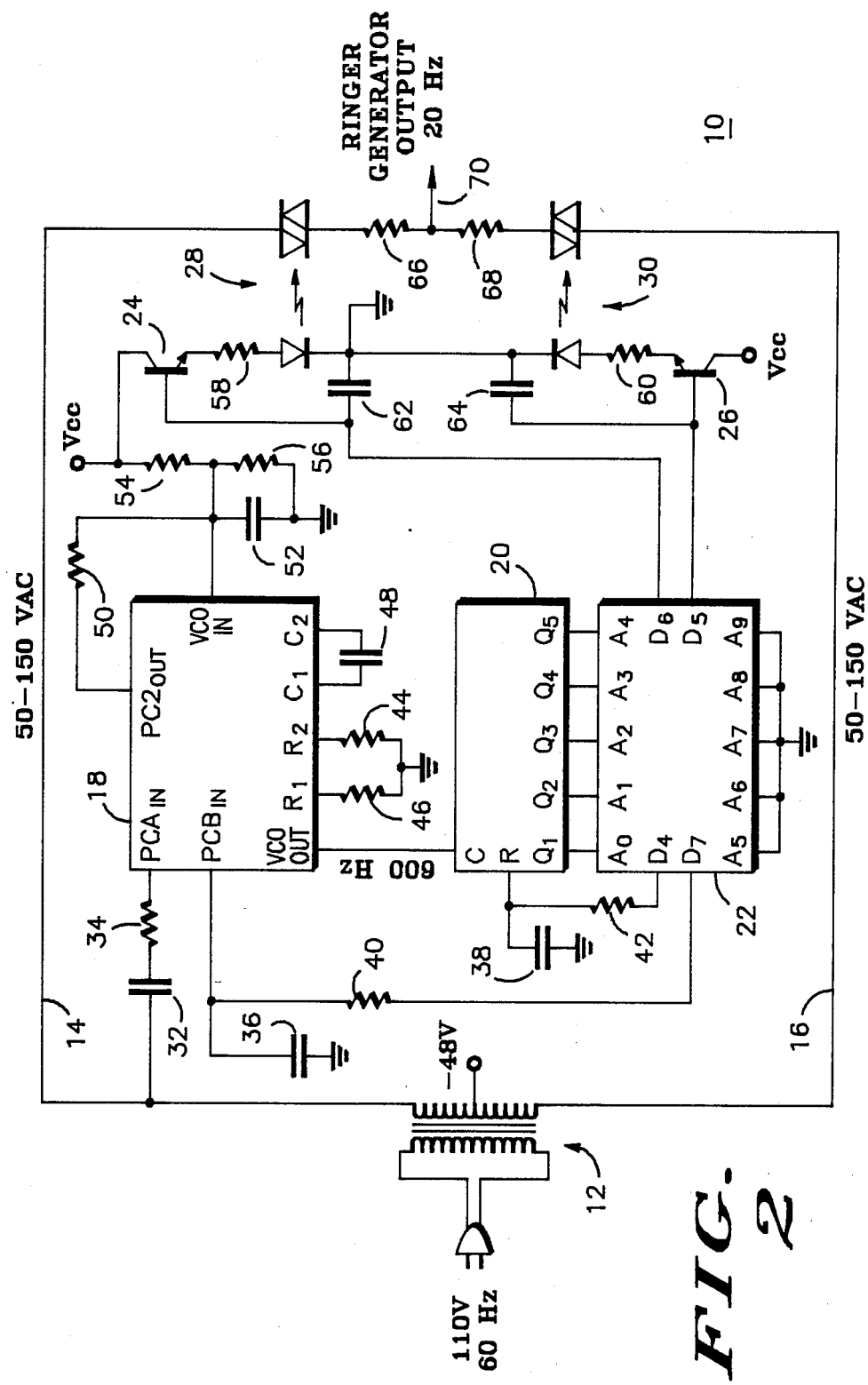

SYNCHRONOUS PROGRAMMABLE SIGNAL GENERATOR AND METHOD

BACKGROUND OF THE INVENTION

The present invention relates, in general, to the field of synchronous programmable signal generators and methods. More particularly, the present invention relates to a signal generator and method for high power, low frequency waveform generation in which input 60 hertz power is systematically switched and rectified to produce subharmonic frequencies of the rectified frequency of the 60 hertz input power.

Various requirements exist for relatively high power, low frequency signal generators including motor speed controllers and telephonic applications. In the latter instance, a 20 hertz generator is utilized to provide the ringing signal in standard telephones. Such generators have in the past been relatively complex and expensive, requiring combinations of motors and generators, amplifiers and transformers or high voltage DC power supplies with a square wave drive.

Therefore, a need has existed for a simple and cost effective method for generating low frequency power, particularly an economical ringing generator for small private branch exchange (PBX) type switches. To this end, while conventional 60 hertz power is comparatively economical as a power source, the frequency is inherently unsatisfactory as a ringing frequency.

SUMMARY OF THE INVENTION

It is therefore an object of the present invention to provide an improved synchronous programmable signal generator and method.

It is further an object of the present invention to provide an improved synchronous programmable signal generator and method which is readily and economically effectuated utilizing a minimum of components.

It is still further an object of the present invention to provide an improved synchronous programmable signal generator and method which utilizes 60 hertz input power to produce subharmonic frequencies of the rectified input power.

It is still further an object of the present invention to provide an improved synchronous programmable signal generator and method which can cost effectively generate a 20 hertz ringing signal for telephonic applications.

The foregoing and other objects are achieved in the present invention wherein there is provided a programmable signal generator for producing an output signal having a frequency bearing a predetermined relationship to an input signal frequency. Frequency synthesizer means generate a synchronous clocking signal in response to the input signal. Counter means are coupled to the clocking signal generating means for developing an address signal in response thereto. Memory means are coupled to the address signal developing means for providing predetermined first and second control signals in response thereto. The first and second control signals have respective passing and rectifying levels thereof. First and second bilateral switching means produce the output signal by alternately passing and rectifying selected portions of the input signal in response to the passing and blocking levels of the first and second control signals respectively.

BRIEF DESCRIPTION OF THE DRAWINGS

The above-mentioned and other features and objects of the present invention and the manner of attaining them will become more apparent and the invention itself will be best understood by reference to the following description of an embodiment of the invention taken in conjunction with the accompanying drawings, wherein:

FIG. 2 is a systematic representation of a ringing signal generator in accordance with the present invention which may be utilized to generate the 20 hertz signal of FIG. 1C by selective switching and rectification of 60 hertz input power through opto-coupled triacs;

DESCRIPTION OF A PREFERRED EMBODIMENT

Figure 1A:
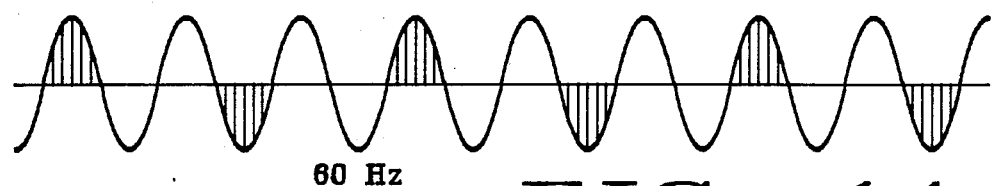
FIG. 1A illustrates a waveform demonstrating the generation of a 20 hertz output signal from a 60 hertz input signal by utilization of every third half cycle.

With reference to FIG. 1A, a waveform illustrative of a 20 hertz output signal derived from a 60 hertz input signal is shown. In this conceptual representation, every third half cycle is utilized for transmission to, for example, a telephone line. While this method results in an effective 20 hertz signal, very little energy is ultimately transmitted. For this reason, dangerously high voltages would be required in order to supply enough energy to a telephone ringing circuit to obtain effective operation thereof.

Figure 1B:
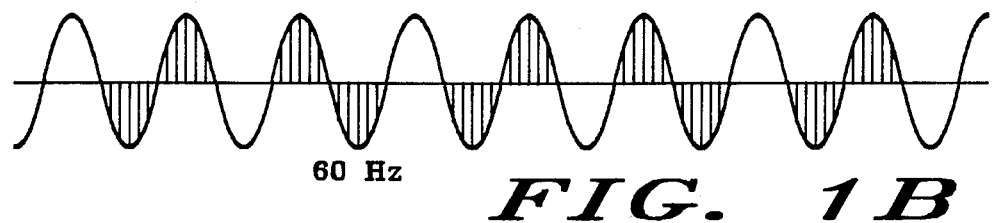
FIG. 1B illustrates a waveform for generating a 20 hertz output signal from a 60 hertz input signal by elimination of every third half cycle.

With reference to FIG. 1B, an alternative conceptional representation of a waveform showing a 20 hertz output signal derived from a 60 hertz input signal is shown. As can be seen, this embodiment eliminates every third half cycle of the 60 cycle input to derive an output 20 hertz signal. As with the above described waveform of FIG. 1A, sufficient energy may still not be contained in the output signal to serve as a ringing generator circuit for telephonic applications.

Figure 1C:
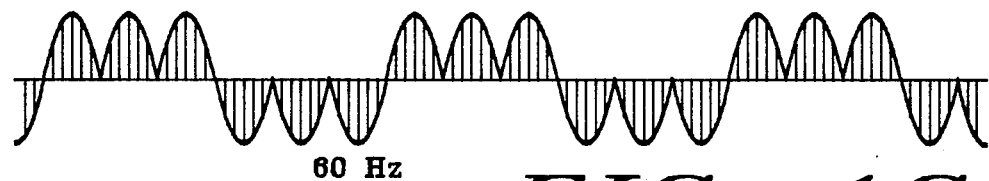
FIG. 1C illustrates a waveform demonstrating the generation of a 20 hertz output signal from a 60 hertz input signal by full wave rectification thereof coupled with a reversing of the rectifiers every third half cycle.

Referring now to FIG. 1C, a 20 hertz output signal generated from a 60 hertz input signal is shown. In this conceptual representation, the input signal is full wave rectified and the rectifiers are reversed every third half cycle. Of the above described schemes for deriving a 20 hertz output signal from a 60 hertz input signal, the waveform of FIG. 1C has most energy in it at 20 hertz and would serve as an effective ringing generator in telephonic applications. It should be noted that a significant 120 hertz component is contained in the resultant output signal. However, this 120 hertz component is below the audio band of most telephone systems. Moreover, the 20 hertz output signal illustrated would have far less audio components than existing square wave generation methods for deriving a telephone ringing signal.

Referring additionally now to FIG. 2, a ringing signal generator 10 in accordance with the present invention is shown. Ringing signal generator 10 receeives an input signal frequency of 60 hertz at 110 volts from a conventional line current power source. This 60 cycle input signal is applied to a primary winding of transformer 12 having a secondary winding connected to AC voltage lines 14, 16 and a center tap connected to a potential of −48 volts.

This 60 hertz input signal frequency is coupled to the $PCA_{IN}$ input of phase locked loop (PLL) 18 by means of series connected capacitor 32 and resistor 34. In the embodiment shown, phase locked loop 18 may be supplied as an MC14046 low power complementary MOS phase locked loop available from Motorola Inc., assignee of the present invention. Phase locked loop 18 contains two phase comparators and a voltage controlled oscillator (VCO). The comparators have two common signal inputs $PCA_{IN}$, $PCB_{IN}$. Input $PCA_{IN}$ can be used directly coupled to large voltage signals, or indirectly coupled (with a series capacitor) to a small voltage signal. A self-bias circuit in series with the input adjusts small voltage signals in the linear region of the amplifier. Phase comparator 1 of the device provides a digital error signal $PC1_{OUT}$, not shown, and maintain 90° phase shift at the center frequency between $PCA_{IN}$ and $PCB_{IN}$ signals (both at 50% duty cycle). A linear VCO produces an output signal $VCO_{OUT}$ whose frequency is determined by the voltage at input $VCO_{IN}$ and capacitor 48 connected between inputs $C_1$ and $C_2$ as well as resistors 44, 46 connected to inputs $R_1$ and $R_2$, which couple the latter inputs to circuit ground. Terminal $PC2_{OUT}$ is resistively coupled to the $VCO_{IN}$ input of phase locked loop 18 by means of resistor 50. The $VCO_{IN}$ input is resistively coupled to a source of supply voltage ($V_{CC}$) by means of resistor 54 as well as coupled to circuit ground through the parallel combination of capacitor 52 and resistor 56. A synchronous clocking signal of 600 hertz is output from phase locked loop 18 at the $VCO_{OUT}$ terminal thereof for input to the clocking input of seven stage ripple counter 20. Seven stage ripple counter 20 may be supplied as a MC14024 low power complementary MOS device likewise available from Motorola Inc. The reset input of seven stage ripple counter 20 is coupled to circuit ground by means of capacitor 38 and is resistively connected to the $D_4$ output of EPROM 22. Outputs Q1, Q2, Q3, Q4 and Q5 are directly coupled to address lines $A_0$, $A_1$, $A_2$, $A_3$ and $A_4$ respectively of EPROM 22. EPROM 22 maybe furnished as a MCM2716 N channel, silicon gate UV erasable PROM also available from Motorola Inc. Address lines $A_5$, $A_6$, $A_7$, $A_8$ and $A_9$ may be connected to circuit ground although they may be programmed to perform other features. Data output $D_7$ is connected to the $PCB_{IN}$ input of phase locked loop 18 forming a feedback connection through resistor 40. Capacitor 36 smooths the $D_7$ output by filtering spikes. Output from EPROM 22 is furnished on data lines $D_6$ and $D_5$ for supplying base drive to transistors 24, 26 respectively.

Transistors 24, 26, in the example shown may be MPSA06 or MPSA05 general purpose transistors. The collector terminals of transistors 24, 26 are connected to $V_{CC}$ while the emitter terminal of transistor 24 is resistively connected to the anode of triac driver output coupler 28, by means of resistor 58. The cathode of triac driver output coupler 28 is connected to circuit ground. Similarly, the emitter of transistor 26 is resistively coupled to the anode of triac driver output coupler 30 by means of resistor 60. The cathode of triac driver output coupler 30 is likewise connected to circuit ground. Capacitors 62 and 64 couple the base terminals of transistors 24 and 26 to circuit ground as shown.

Triac driver output couplers 28, 30 may be supplied as MOC3030 devices available from Motorola Inc. These devices incorporate a gallium-arsenide infrared emitting diode, optically coupled to a silicon bilateral switch and are zero voltage crossing devices. The silicon bilateral switch portion of traic driver output couplers 28, 30 are respectively connected to AC voltage lines 14, 16 and resistively connected to output lines 70 by means of resistors 66, 68.

Figure 3:
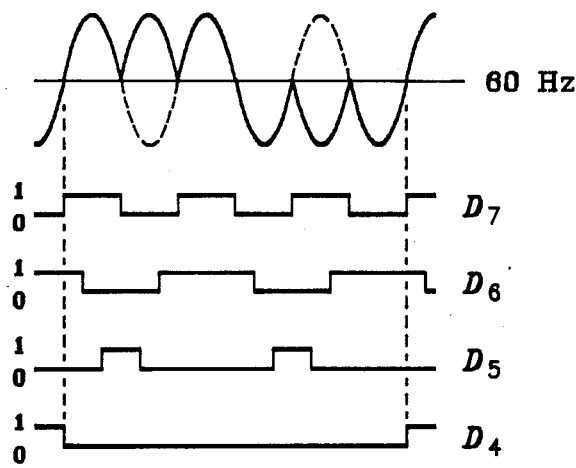
FIG. 3 is a timing diagram of the outputs from the EPROM utilized in controlling the opto-coupled triacs of the ringing signal generator of FIG. 2 for providing the 20 hertz output signal of FIG. 1C.

Referring additionally now to FIG. 3, the timing outputs of EPROM 22 at data lines $D_4$, $D_5$, $D_6$ and $D_7$ are shown. The output at data line $D_4$ supplies a reset input to seven stage ripple counter 20 through resistor 42 which is filtered by means of capacitor 38. Clocking inputs are supplied to EPROM 22 from seven stage ripple counter 20. Feedback from EPROM 22 is supplied to phase locked loop 18 at input $PCB_{IN}$ from data line $D_7$ of EPROM 22 through a filter network comprising resistor 40 and capacitor 36. EPROM 22 supplies base drive to transistors 24, 26 at outputs $D_6$ and $D_5$ respectively in response to an internal program as accessed by the condition of address lines $A_0$, $A_1$, $A_2$, $A_3$ and $A_4$. Capacitors 62 and 64 filter noise spikes from outputs $D_6$ and $D_5$ respectively. As shown in FIG. 3, by appropriate full wave rectification and reversing of traic driver output couplers 28, 30 on every third half cycle, a 60 hertz input signal frequency may be converted to a 20 hertz output signal frequency. Data lines $D_5$ and $D_6$ are intended to become active prior to the zero crossing. The zero crossing triac driver output couplers 28, 30 will not turn on until a zero voltage threshold has been reached.

In the embodiment above-described, resistors 40 and 42 may be 10,000 ohm devices while capacitors 36, 38 have a value of 91 pF. Capacitor 32 may have a value of 0.1 microfarad while resistors 34, 44 and 50 have a value of 1 Meg ohms. Resistor 46 has a value of 39K ohms while resistors 54 and 56 have a value of 100K ohms. Capacitor 52 has a value of 0.1 microfarad while capacitors 48, 62 and 64 have a value of 0.01 microfarad. Resistors 58, 60 have a value of 200 ohms. It should be noted that resistors 54, 56, 46, 44 and capacitor 48 have a value in conjunction with the level of $V_{CC}$ such that an output frequency of approximately $600H_z$ appears on $VCO_{OUT}$ without an input signal on $PCA_{IN}$ or $PCB_{IN}$. These latter two inputs to PLL 18 plus the values of resistor 50 and capacitor 52 in conjunction with seven stage ripple counter 20 and a properly programmed EPROM 22, synchronize the signal on output $D_7$ to the 60 HZ line signal.

The 600 HZ signal on $VCO_{OUT}$ is 10 times the 60 HZ input frequency which gives 10 clock/address cycles per HZ resulting in 10 synchronous divisions of the 60 HZ power cycle. These divisions are used to activate triac driver output couplers 28, 30 so as to eliminate the possibility of both devices being active simultaneously yet allow them to be activated prior to zero crossing so as to eliminate the possibility of flat spots in the power output. The counter output at Q5 ($2^5=32$) ensures that EPROM 22 will generate one complete 20 HZ period (three 60 HZ cycles) which is 30 clocks to the counter ($2^5-2$). Clock 30 then resets to clock 0.

What has been provided therefore, is an improved synchronous programmable signal generator and method which is readily and economically effectuated utilizing a minimum of components. The signal generator and method of the present invention utilizes 60 hertz input power to produce subharmonic frequencies of the rectified input power. The synchronous programmable signal generator and method of the present invention can cost-effectively generate a 20 hertz ringing signal for telephonic applications. However, it should be apparent that, depending upon the programming of EPROM 22, various subharmonic frequencies of 120 hertz (the rectified frequency of the 60 hertz input power) may also be generated e.g. 60, 40, 30, 24, 20, 17.2, 15, etc.

While there have been described above the principles of the invention in conjunction with specific apparatus, it is to be clearly understood that this description is made only by way of example and not as a limitation to the scope of the invention.

I claim:

1. A programmable signal generator for producing an output signal having a frequency bearing a predetermined relationship to an input signal frequency comprising:
   frequency synthesizer means for generating a synchronous clocking signal in response to said input signal;
   counter means coupled to said clocking signal generating means for developing an address signal in response thereto;
   memory means coupled to said address signal developing means for providing predetermined first and second control signals in response thereto, said first and second control signals having respective passing and rectifying levels thereof; and
   first and second bilateral switching means for producing said output signal by alternately passing and rectifying selected portions of said input signal in response to said passing and rectifying levels of said first and second control signals respectively.

2. The programmable signal generator of claim 1 wherein said clocking signal generating means comprises a phase locked loop.

3. The programmable signal generator of claim 1 wherein said address signal developing means comprises a ripple counter.

4. The programmable signal generator of claim 1 wherein said control signal providing means comprises a programmable read-only memory.

5. the programmable signal generator of claim 1 wherein said first and second bilateral switching devices comprise opto-coupled triacs.

6. The programmable signal generator of claim 1 wherein said input signal frequency is 60 hertz.

7. The programmable signal generator of claim 1 wherein said output signal frequency is 20 hertz.

8. A method for producing an output signal having a frequency bearing a predetermined relationship to an input signal frequency comprising the steps of:
   generating a synchronous clocking signal in response to said input signal;
   developing an address signal in response to said clocking signal;
   providing predetermined first and second control signals in response to said address signal, said first and second control signals having respective passing and rectifying levels thereof;
   rectifying selected portions of said input signal in response to said first and second control signal; and
   passing selected portions of said input signal in response to said first and second control signals.

9. The method of claim 8 wherein said step of generating is carried out by means of a phase locked loop.

10. The method of claim 8 wherein said step of developing is carried out by means of a ripple counter.

11. The method of claim 8 wherein said step of providing is carried out by means of a programmable read-only memory.

12. The method of claim 8 wherein said steps of passing and rectifying are carried out by opto-coupled triacs.

13. A telephone system including a programmable signal generator for producing a ringing signal having a frequency bearing a predetermined relationship to a 60 hertz input signal comprising:
   frequency synthesizer means for generating a synchronous clocking signal in response to said 60 hertz input signal;
   counter means coupled to said clocking signal generating means for developing an address signal in response thereto;
   memory means coupled to said address signal developing means for providing predetermined first and second control signals in response thereto, said first and second control signals having respective passing and rectifying levels thereof; and
   first and second bilateral switching means for producing said ringing signal by alternately passing and rectifying selected portions of said 60 HZ input signal in response to said passing and rectifying levels of said first and second control signals respectively.

14. The telephone system of claim 13 wherein said clocking signal generating means comprises a phase locked loop.

15. The telephone system of claim 13 wherein said address signal developing means comprises a ripple counter.

16. The telephone system of claim 13 wherein said control signal providing means comprises a programmable read-only memory.

17. The telephone system of claim 13 wherein said first and second bilateral switching devices comprise opto-coupled triacs.

18. The telephone system of claim 13 wherein said ringing signal frequency is substantially 20 hertz.

* * * * *